No. 833,383. PATENTED OCT. 16, 1906.
G. GUINTHER.
FRUIT PICKER'S BAG.
APPLICATION FILED JULY 25, 1905.
2 SHEETS—SHEET 1.
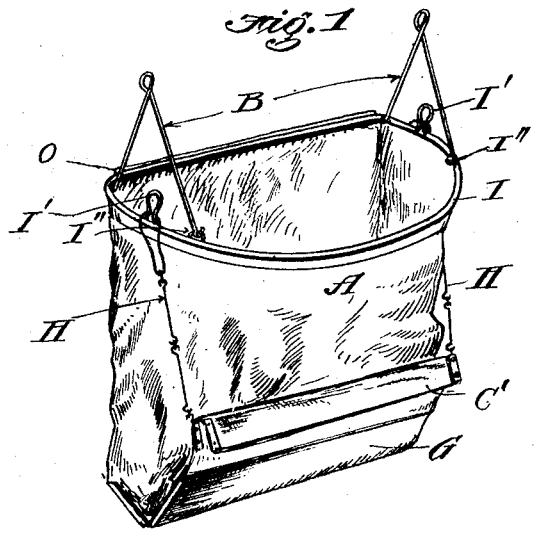
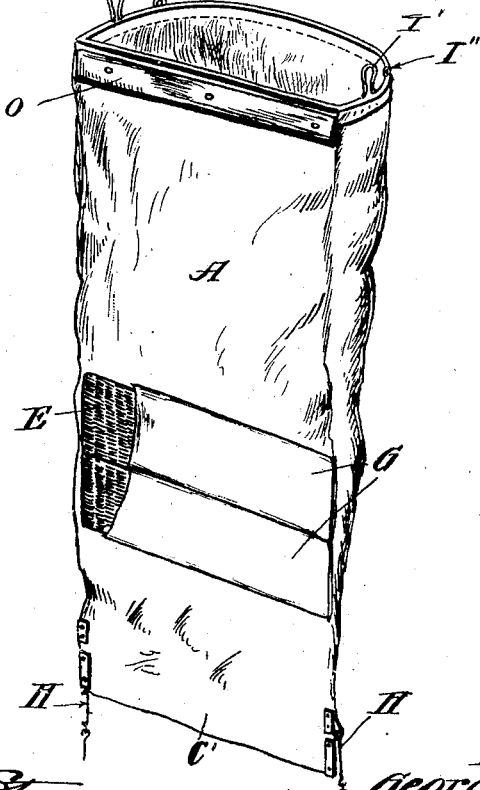
Witnesses
Inventor
George Guinther
by Hazard & Harpham
Attorneys.

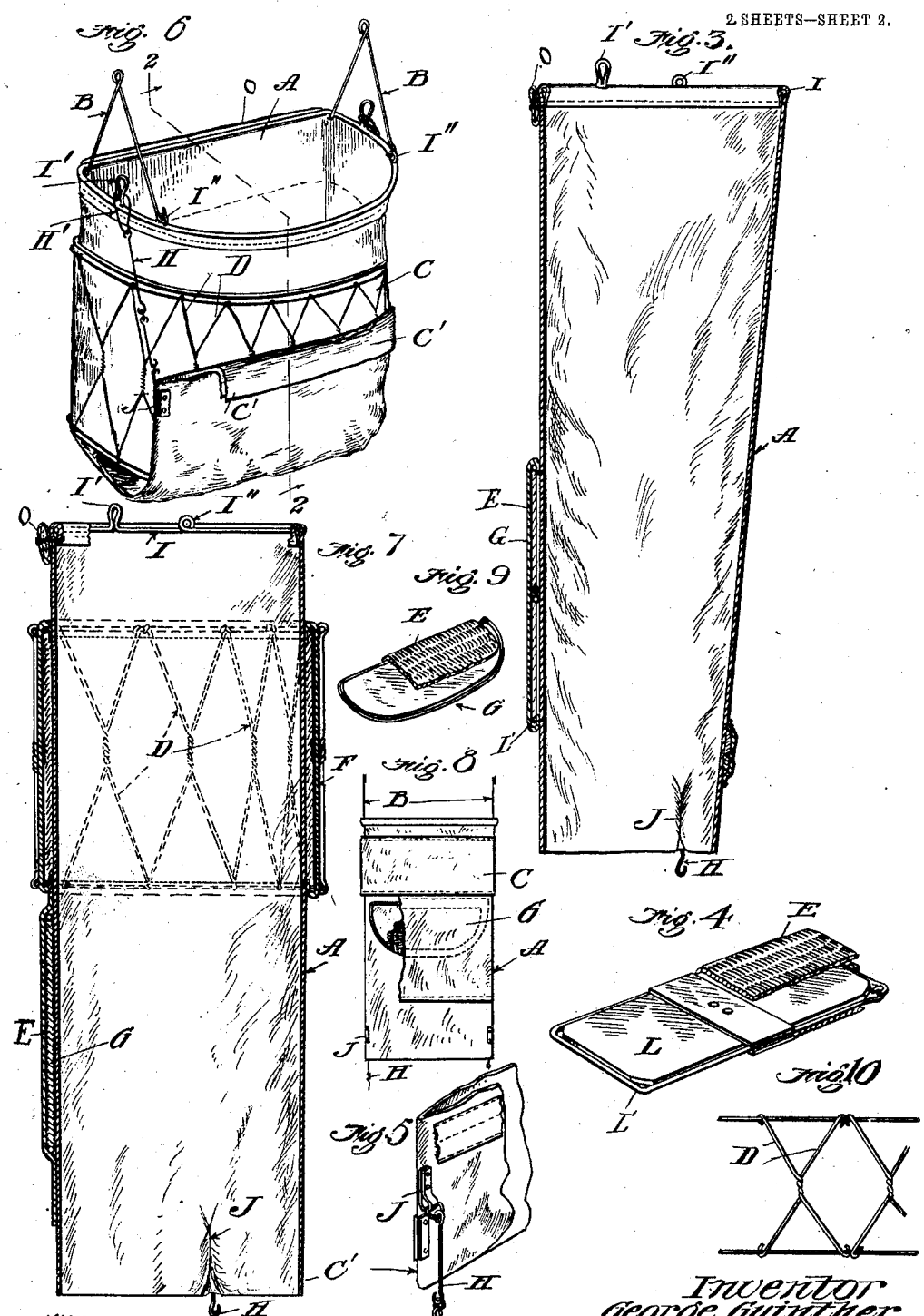

UNITED STATES PATENT OFFICE.

GEORGE GUINTHER, OF COVINA, CALIFORNIA.

FRUIT-PICKER'S BAG.

No. 833,383.   Specification of Letters Patent.   Patented Oct. 16, 1906.

Application filed July 25, 1905. Serial No. 271,229.

*To all whom it may concern:*

Be it known that I, GEORGE GUINTHER, a citizen of the United States, residing at Covina, in the county of Los Angeles and State of California, have invented new and useful Improvements in Fruit-Pickers' Bags, of which the following is a specification.

The object of my invention is to provide a handy fruit-picker's bag which will prevent the fruit from injury while being picked or discharged therefrom, also to provide a fruit-picker's bag which can be placed on the ground or ladder and will not sag and injure the fruit thereby. I accomplish these objects by means of the bag described herein and shown in the accompanying drawings, in which—

Figure 1 is a perspective view of a fruit-picker's bag embodying my invention in its open spread-out position ready to receive the fruit, the conventional supporting shoulder-straps being omitted as unnecessary to illustrate in any manner the invention. Fig. 2 is a perspective view of the same, looking diagonally from the rear, in its dropped or emptying position. Fig. 3 is a central vertical section of my bag in the position shown in Fig. 2. Fig. 4 is a perspective view of one member of the folding bottom. Fig. 5 is a perspective view of the front corner of the bag. Fig. 6 is a perspective view of a modified form of my bag, the bottom in its closed position for use. Fig. 7 is a central vertical section of the modified form as shown in Fig. 6, the bottom being in its dropped or emptying position. Fig. 8 is a rear view of the modified bag. Fig. 9 is a perspective view of the bottom-closing pad in the modified bag. Fig. 10 is a fragmentary view of the wire shield.

In the drawings, A represents the bag, preferably made of canvas, supported in the usual manner by conventional shoulder-straps (not shown) attached to the bag-supporting bails B. Extending around the top of the bag is the top supporting-wire I, to which the top end of the canvas forming the bag is sewed. The loop I' on the top wire extends up through the canvas and forms hooks for the engagement of the loop H' on the bottom-supporting devices H. A strip of stiff material O is secured to the rear of the top supporting-wire I, causing that member to form a half-circle, an eye I'' being also formed in the top wire for the engagement of the supporting-bails B.

In the modified form of my improved bag, as shown in Fig. 6, I have shown a wire shield D. This shield is made to drop over the head of and surrounds the bag and will protect the fruit that may be contained in the bag from injury. The bag at this point is thickened or padded, as at F, to prevent the fruit from crowding against the wire and bruising. A fragment of the wire comprising this shield is shown in Fig. 10.

When the bag is full of fruit and it is desired to empty the same, the bottom-supporting devices H are detached from the loop I' and permitted to drop, and the bottom of the bag will fall down in a spread-out condition and permit the fruit to be easily discharged therefrom without in any manner crowding or bruising the fruit.

To form a reliable bottom for the bag, which will not bruise the fruit and that can be readily dropped so as to let the contents empty itself from the bag and at the same time prevent the bag from sagging while sitting on the uneven ground or on a ladder, and thereby injure the fruit, I have constructed the bottom G (comprising two members pivoted together) of a central body portion of light wood L and surrounded by a covering of matting E, held in place by a wire L', which surrounds the outer edge of the block and matting. These members are secured to the bottom of the bag and arranged to fold under the bag and form a closure for the bottom when the bag is in position for use, as shown in Fig. 1, and when the bottom-supporting wires are disengaged will drop into position shown in Fig. 2. In Fig. 7 the bottom G is made in a single piece. Below the point where the lowest member of the bottom is secured to the bag are riveted hooks for the attachments of the bottom-supporting devices H, so that when the bottom is in its closed position ready for use, as shown in Fig. 1, the bottom members will spread themselves out below the bottom of the bag and form a closure therefor and the extension of the canvas forming the bag will drop down and form a closing-flap C', as shown in Fig. 1, and prevent the possibility of any fruit passing out of the bag while the bottom-supporting wires are hooked onto the loops I' of the top wire. In the use of these bags it is found that when the bottom is folded up unless an extension is made on the bag the fruit is liable to work out past the fold and discharge itself from the bag. To prevent this, I have provided the extension on the canvas forming the bag which will hold over and drop downwardly, as shown in Fig. 1, and prevent any accidental loss of the fruit, and at the same time form a chute for the discharge of the fruit when it is being discharged from the bag. This extension on the bottom of the bag will form a reliable bottom for the bag without providing any cross rigid piece extending across the front of the bag between the points J, (where the supporting devices H are secured to the bag,) as is usual in bags of this character.

Having described my invention, what I claim as new, and desire to secure by Letters Patent, is—

1. A bag of the character herein described having means to prevent the accidental loss of fruit while the bag is being filled comprising bottom-supporting devices an extension on the bottom of the bag below the point where said bottom-supporting devices are secured.

2. A bag open at both ends, a stiffening means secured to one side of said bag, and adapted to form a bottom and means for supporting the said bottom.

3. A fruit-picker's bag of the character herein described having a bottom comprising two members pivoted together and disposed at one side and near the bottom end of the bag and adapted to be partly folded together to form the bottom of the bag.

4. A bag, one end of which to be used as a mouth, and the other as a chute, with a portion of one side stiffened and adapted to fold and form a bottom and means for holding said bottom in position.

In witness that I claim the foregoing I have hereunto subscribed my name this 19th day of July, 1905.

GEORGE GUINTHER.

Witnesses:
HENRY T. HAZARD,
MARGARETE C. NECKELESON.